US012750461B2

(12) United States Patent
Volfson

(10) Patent No.: US 12,750,461 B2
(45) Date of Patent: Sep. 29, 2026

(54) SMART BEACON VIDEO-BASED COMMUNICATION PROTOCOL

(71) Applicant: Torrey Pines Logic, Inc., San Diego, CA (US)

(72) Inventor: Leo Volfson, San Diego, CA (US)

(73) Assignee: Torrey Pines Logic, Inc., San Diego, CA (US)

( * ) Notice: Subject to any disclaimer, the term of this patent is extended or adjusted under 35 U.S.C. 154(b) by 58 days.

(21) Appl. No.: 19/030,544

(22) Filed: Jan. 17, 2025

(65) Prior Publication Data

US 2025/0240386 A1 Jul. 24, 2025

Related U.S. Application Data

(60) Provisional application No. 63/623,433, filed on Jan. 22, 2024.

(51) Int. Cl.

| | |
|---|---|
| ***H04N 7/035*** | (2006.01) |
| ***G06T 7/73*** | (2017.01) |
| ***H04N 7/22*** | (2006.01) |
| ***H04N 23/11*** | (2023.01) |

(52) U.S. Cl.
CPC ............. *H04N 7/0352* (2013.01); *G06T 7/73* (2017.01); *H04N 7/22* (2013.01); *H04N 23/11* (2023.01); *G06T 2207/10016* (2013.01); *G06T 2207/10048* (2013.01)

(58) Field of Classification Search
CPC ........ H04N 7/0352; H04N 7/22; H04N 23/11; G06T 7/73; G06T 2207/10016; G06T 2207/10048; H04B 10/116
See application file for complete search history.

(56) References Cited

U.S. PATENT DOCUMENTS

2018/0095155 A1* 4/2018 Soni ......................... G08G 5/50

* cited by examiner

*Primary Examiner* — Girumsew Wendmagegn
(74) *Attorney, Agent, or Firm* — Fish & Richardson P.C.

(57) ABSTRACT

A computer-implemented method includes receiving, by a smart beacon video processor and from a digital video camera, digital video data including light from a smart beacon. The smart beacon video processor processes the digital video data to determine a smart beacon pixel location. The smart beacon video processor analyzes the smart beacon pixel location. The smart beacon video processor determines blank video frames associated with the smart beacon pixel location as determined blank video frames. The smart beacon video processor decodes as message data the determined blank video frames.

21 Claims, 5 Drawing Sheets

SMART BEACON VIDEO-BASED COMMUNICATION PROTOCOL

CROSS-REFERENCE TO RELATED APPLICATION

This application claims priority under 35 U.S.C. § 119 to U.S. Application Ser. No. 63/623,433, filed on Jan. 22, 2024, the contents of which is hereby incorporated by reference.

BACKGROUND

Beacons can be used to covertly mark fixed or moving objects, such as buildings, vehicles, personnel, and equipment. Thermal beacons typically operate by flashing light in the mid-wave infrared (IR) band of 3-5 microns to be undetectable by conventional image intensifier-based night vision equipment and to penetrate adverse weather/climate conditions (e.g., fog, rain, snow, smoke, sand, and dust), although broadband thermal, near-IR, short-wave IR (SWIR), and visible light spectrum emitters can be used. Beacons are typically designed to operate by uniform flashing, flashing a pattern, or flashing in unison with other beacons. While useful, the flashing is of limited communication utility.

SUMMARY

The present disclosure describes a smart beacon video-based communication protocol.

In an implementation, a computer-implemented method, comprises: receiving, by a smart beacon video processor and from a digital video camera, digital video data including light from a smart beacon; processing, by the smart beacon video processor, the digital video data to determine a smart beacon pixel location; analyzing, by the smart beacon video processor, the smart beacon pixel location; determining, by the smart beacon video processor and as determined blank video frames, blank video frames associated with the smart beacon pixel location; and decoding, by the smart beacon video processor and as message data, the determined blank video frames.

The described subject matter can be implemented using a computer-implemented method; a non-transitory, computer-readable medium storing computer-readable instructions to perform the computer-implemented method; and a computer-implemented system comprising one or more computer memory devices interoperably coupled with one or more computers and having tangible, non-transitory, machine-readable media storing instructions that, when executed by the one or more computers, perform the computer-implemented method/the computer-readable instructions stored on the non-transitory, computer-readable medium.

The subject matter described in this specification can be implemented to realize one or more of the following advantages. First, the described smart beacon video-based communication protocol permits a beacon to communicate data apart from that of the flashing light produced by the beacon. Data is encoded in the blank video frames between the produced light flashes, in both visible/non-visible spectrums. Third, the communication protocol is secure. Since the smart beacon is not actually broadcasting data, data security is enhanced. Fourth, video recorded by any camera capable of detecting the particular operating light frequency of a smart beacon using the described video-based communication protocol can be processed to extract data associated with the smart beacon. Data can be transmitted that will automatically sync with 25 or 30 frames/second as well as 50/60 Hz. Fifth, the smart beacon is programmable so that data encoding can be changed at a desired frequency, further enhancing security. Sixth, a receiver built into a smart beacon can be used to activate/deactivate the smart beacon and program the smart beacon's communications using the video-based communication protocol.

The details of one or more implementations of the subject matter of this specification are set forth in the Detailed Description, the Claims, and the accompanying drawings. Other features, aspects, and advantages of the subject matter will become apparent to those of ordinary skill in the art from the Detailed Description, the Claims, and the accompanying drawings.

DESCRIPTION OF DRAWINGS

Like reference numbers and designations in the various drawings indicate like elements.

DETAILED DESCRIPTION

The following detailed description describes a smart beacon video-based communication protocol and is presented to enable any person skilled in the art to make and use the disclosed subject matter in the context of one or more particular implementations. Various modifications, alterations, and permutations of the disclosed implementations can be made and will be readily apparent to those of ordinary skill in the art, and the general principles defined can be applied to other implementations and applications, without departing from the scope of the present disclosure. In some instances, one or more technical details that are unnecessary to obtain an understanding of the described subject matter and that are within the skill of one of ordinary skill in the art may be omitted so as to not obscure one or more described implementations. The present disclosure is not intended to be limited to the described or illustrated implementations, but to be accorded the widest scope consistent with the described principles and features.

Beacons can be used to covertly mark fixed or moving objects, such as buildings, vehicles, personnel, and equipment. Thermal beacons typically operate by flashing light in the mid-wave (MW) infrared (IR) band of 3-5 microns to be undetectable by conventional image intensifier-based night vision equipment and to penetrate adverse weather/climate conditions (e.g., fog, rain, snow, smoke, sand, and dust), although broadband thermal, near-IR (NIR), short-wave IR (SWIR), and visible light spectrum emitters can be used. Beacons are typically designed to operate by uniform flashing, flashing a pattern, or flashing in unison with other beacons. While useful to identify a particular object the beacon is attached to (at least used as identification friend or foe (IFF)), the beacon flashes are of limited communication utility.

Considering that equipment necessary to view beacons flashing in the MWIR band can be extremely expensive and complex, maximizing usefulness of a beacon is important.

Described is an approach for a smart beacon video-based communication protocol that permits data to be encoded into blank video frames between produced light flashes of a beacon. The blank video frames in a digital video recording can be distinguished from the smart beacon flashes and extracted/decoded using digital video analysis down to a pixel-level of a video image. Since the smart beacon is not actually broadcasting data, data security is enhanced. Video recorded by any camera capable of detecting a particular light frequency used by the smart beacon can be used for processing to extract data associated with the smart beacon. The smart beacon is programmable so that data encoding can be changed when desired, further enhancing security.

Figure 1:
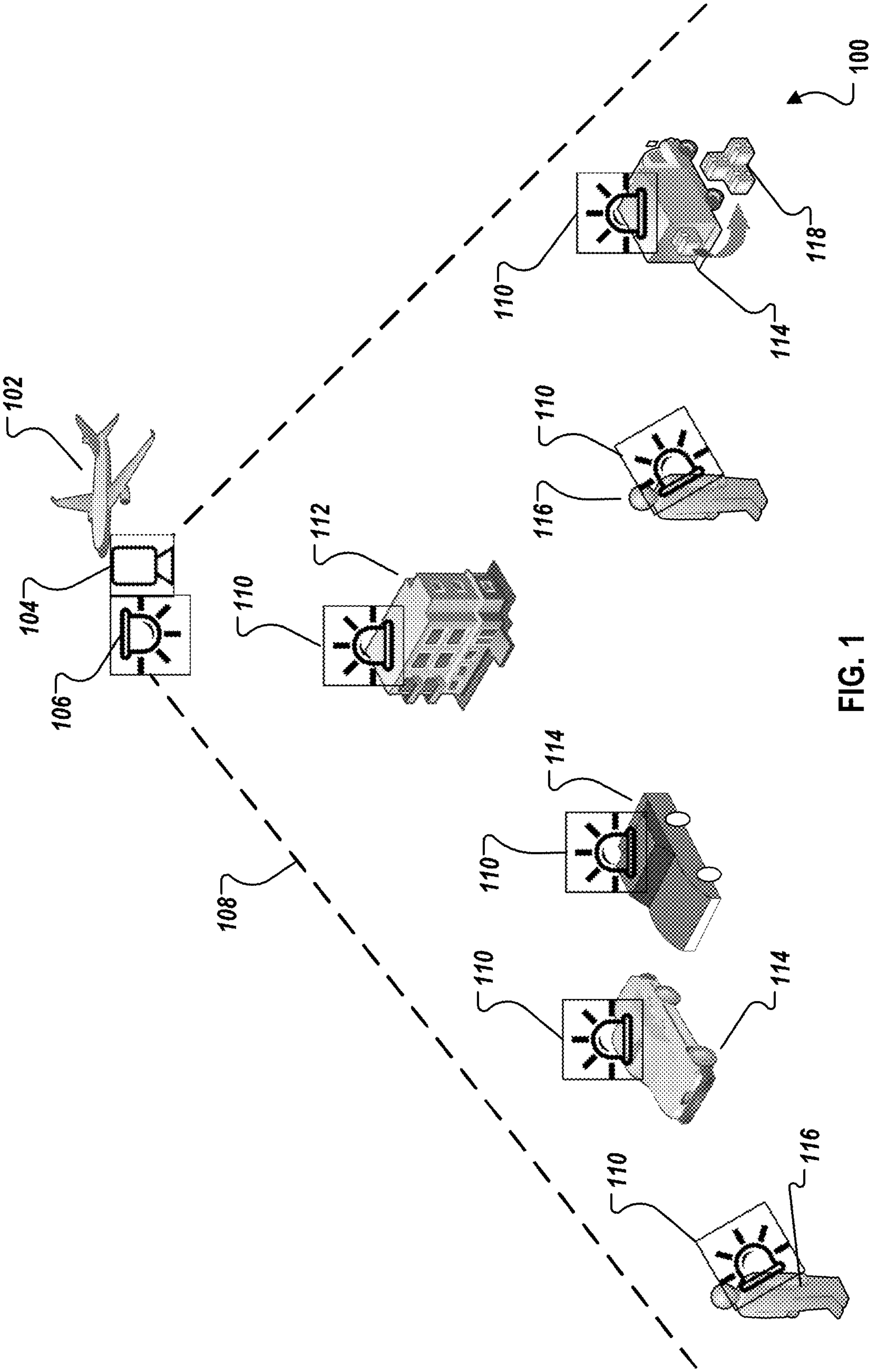
FIG. 1 is an illustration of a field-of-view of an aircraft viewing smart beacons attached to various objects, according to an implementation of the present disclosure.

FIG. 1 is an illustration 100 of a field-of-view of an aircraft viewing smart beacons attached to various objects, according to an implementation of the present disclosure.

Aircraft 102 includes a camera 104 and light-emitting element 106. Aircraft 102 can include airplanes, helicopters, drones, balloons/blimps, or other types of lighter than aircraft. Camera 104 includes digital video cameras that can detect light in one or more of the MWIR band, broadband thermal, NIR, SWIR, and visible light spectrums. In some implementations, camera 104 records digital video at a 20, 30, or 60 Hz frame rate. The camera 104 and/or light-emitting element 106 can have a field-of-view/transmission of 108, which will vary depending on the resolution and light detecting capability of camera 104 (e.g., optics and/or detectors) and/or frequency/transmission power of the light-emitting element 106. Light emitting element 106 can include a beacon, laser, spotlight, or other light emitting element emitting light (e.g., receivable by an appropriately configured smart beacon).

FIG. 1 also illustrates smart beacons 110 attached to objects such as buildings 112, vehicles 114, personnel 116, and equipment 118. Each smart beacon 110 can be configured to emit flashes of light in a uniform pattern, in unison with other beacons, or with a particular pattern to permit encoding of data between beacon flashes.

Figure 2:
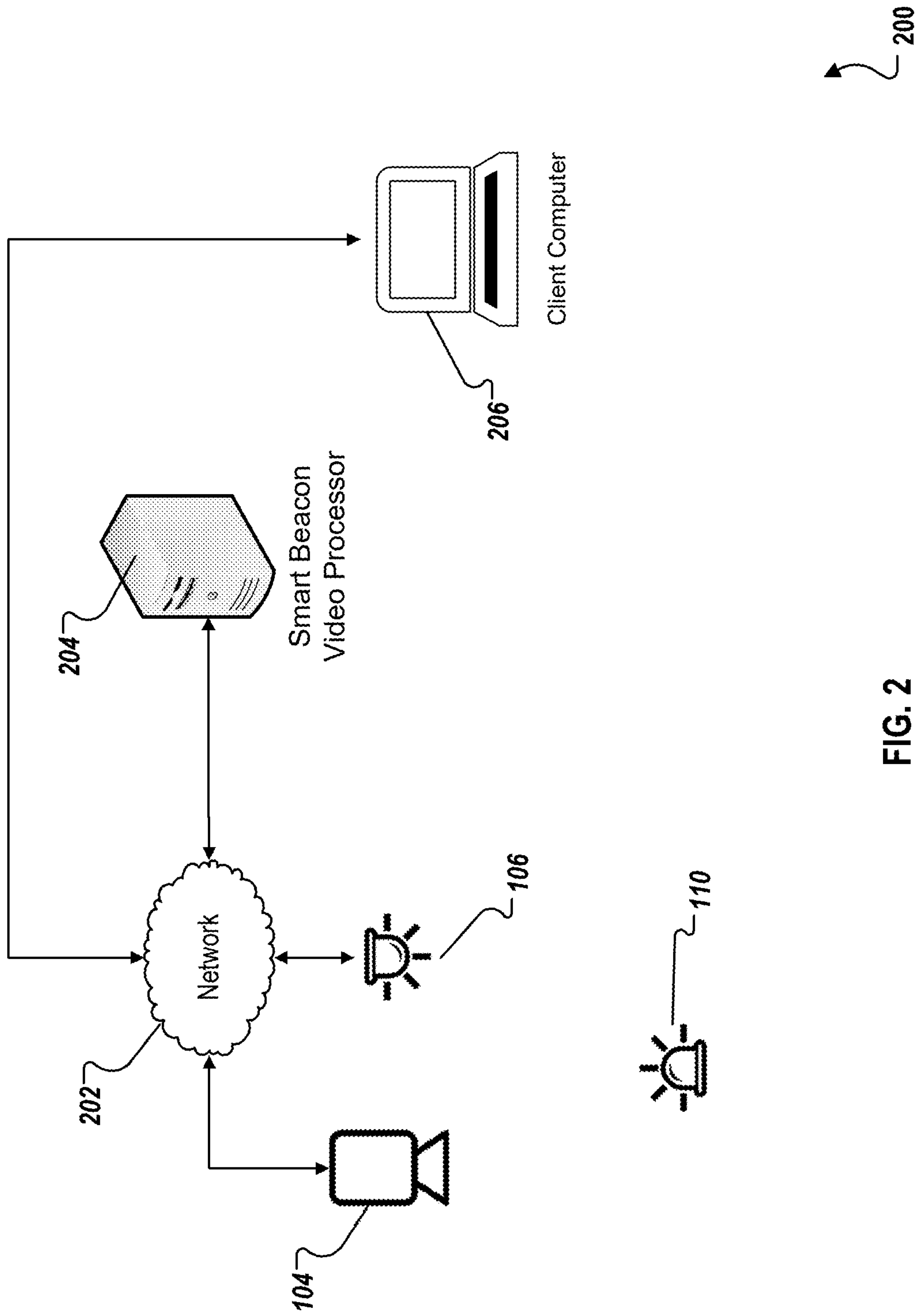
FIG. 2 is a block diagram of a computer-implemented system for providing a smart beacon video-based communication protocol, according to an implementation of the present disclosure.

FIG. 2 is a block diagram of a computer-implemented system 200 for providing a smart beacon video-based communication protocol, according to an implementation of the present disclosure.

In some implementations, system 200 includes camera 104, light-emitting element 106, smart beacon 110, a network 202, smart beacon video processor 204, and client computer 206. At a high-level, digital video gathered by camera 104 is transmitted using network 202 to the smart beacon video processor 204 for processing. Processed result data is transmitted using the network 202 to client computer 206. Light-emitting element 106 can used to emit light to transmit commands/data to a smart beacon 110.

Network 202 can be any form or medium of wireline or wireless digital data communication (or a combination of data communication) as described below. In some implementations, one or more components of system 200 can be combined into a single component or further divided as understood by those of ordinary skill in the art.

In some implementations, light-emitting element 106 can include/operate as a beacon similar to smart beacon 110 (emitting flashes of light and encoding data between flashes) . In some implementations, light-emitting element 106 can include a laser, spotlight, or other light emitting element emitting light that is receivable by an appropriately configured smart beacon 110. The light-emitting element 106 can be configured to emit light to command smart beacons 110 configured with appropriate receiving hardware/software, for example, to turn ON/OFF, change functionality, switch between active/passive mode, accept programming commands, change data alphabet/language readable in blank video frames, and other functionality consistent with this disclosure.

For example, a smart beacon 110 configured with a light receiving aperture could receive instructions from a drone-attached light-emitting element 106 by laser, light flash with encoded information, or by processing blank video frames between light flashes. In some implementations, a smart beacon 110 can be configured with a hardware port (e.g., USB or other port) or a radio frequency receiver to receive instructions.

In some implementations, the smart beacon video processor 204 includes software to process digital video to the pixel-level. In some implementations, the software can generate an identification/message value (or halo) situated at each beacon location in the video to display a name, identification (ID) number, or message. For example, in a military situation, a troop ID number could be displayed above the smart beacon 110 as well as a short message, such as "OKRP"—meaning "OK, ready to proceed"—or "MDV"—meaning "medical evacuation needed." If a vehicle is non-operational, the vehicle ID number and "OOC"—meaning "out of commission" could be displayed above the vehicle smart beacon 110.

In some implementations, For the software can be configured to ignore areas of the video without flashing smart beacons 110 to increase processing efficiency and to focus on analyzing the flashing elements in the video to determine the number of blank video frames for a particular video frame rate between detected flashes. In this way, only relatively little of the actual video data needs to be processed to provide situational awareness and identification of multiple smart beacons 110.

In some implementations, when strobing, a smart beacon 110 produces 3-5 micron emissions of light. Strobe flash timing is relatively constant (i.e., the time it takes an emitter to heat up and cool down when emitting light). Smart beacons 110 can typically be set to, for example, 1, 1.5, 2, 2.5 Hz strobing frequency, which corresponds generally to about a 30 Hz video frame rate. In some implementations, smart beacon 110 strobe frequency could be as high as 50/60 Hz. This means that a single typical strobe will encompass multiple frames of a video. For the purposes of this disclosure and to aid understanding, it will be assumed that a strobe only requires one video frame in a prescribed video frame rate. The smart beacon 110 strobing frequency is adjusted to flash the strobe to encode a desired number of blank video frames within the video at a particular video frame rate.

The smart beacon video processor 204 software can monitor a video recording and decode the blank video frames between smart beacon 110 flashes to produce data. Since it may be possible for a message in video to be picked up midstream (e.g., the second half of an eight-digit ID number or name), the processing software can process the video for multiple iterations of a message before relaying data to the client computer 206. For example, if an ID number is initially cut in half (for example, "3107" is received, but two further complete message processing cycles will allow the processing software to correlate a correct/complete ID number of 8 characters, "AMJM3107" and to discard the initial incomplete number). In some implementations a defined spacing could be introduced to delimit the end/start of a message (e.g., one second).

In some implementations, processing/parsing algorithms can be configured with contextual intelligence to understand that a complete message/data set should resemble to assist with proper processing. Typically processing takes about 2 seconds to complete processing of an encoded message 2-3 times. If a message is relatively long, it may take more time to complete processing. Time for processing can also depend on the capabilities of the digital video camera (e.g., resolution, aperture size, sensitivity, internal processing capability/speed, and data transmission capacity) observing the smart beacon 110. As will be understood by those or ordinary skill in the art, a closer distance and higher video frame rate can decrease overall message processing time.

In some implementations, software used by the smart beacon video processor 204 can be spatially aware of flashing smart beacon 110 associated pixel locations. For example, if a smart beacon 110 at a particular location in the video were to suddenly enter a smart beacon 110 tagged building (such as, building 112 in FIG. 1) or vehicle (such as, vehicle 114 in FIG. 1) and be obscured, the software could keep track of the entering smart beacon knowing that it is likely within the building or vehicle and display a message near/above the building/vehicle to indicate the presence of the non-visible smart beacon 110. As another example, the software can keep track of moving smart beacons 110s in a video recording to correlate them with prior determined smart beacon 110 values and to assist with determining which areas of a video frame processing can be ignored going forward since the smart beacon 110 flash is moving within the video frames.

Figure 3:
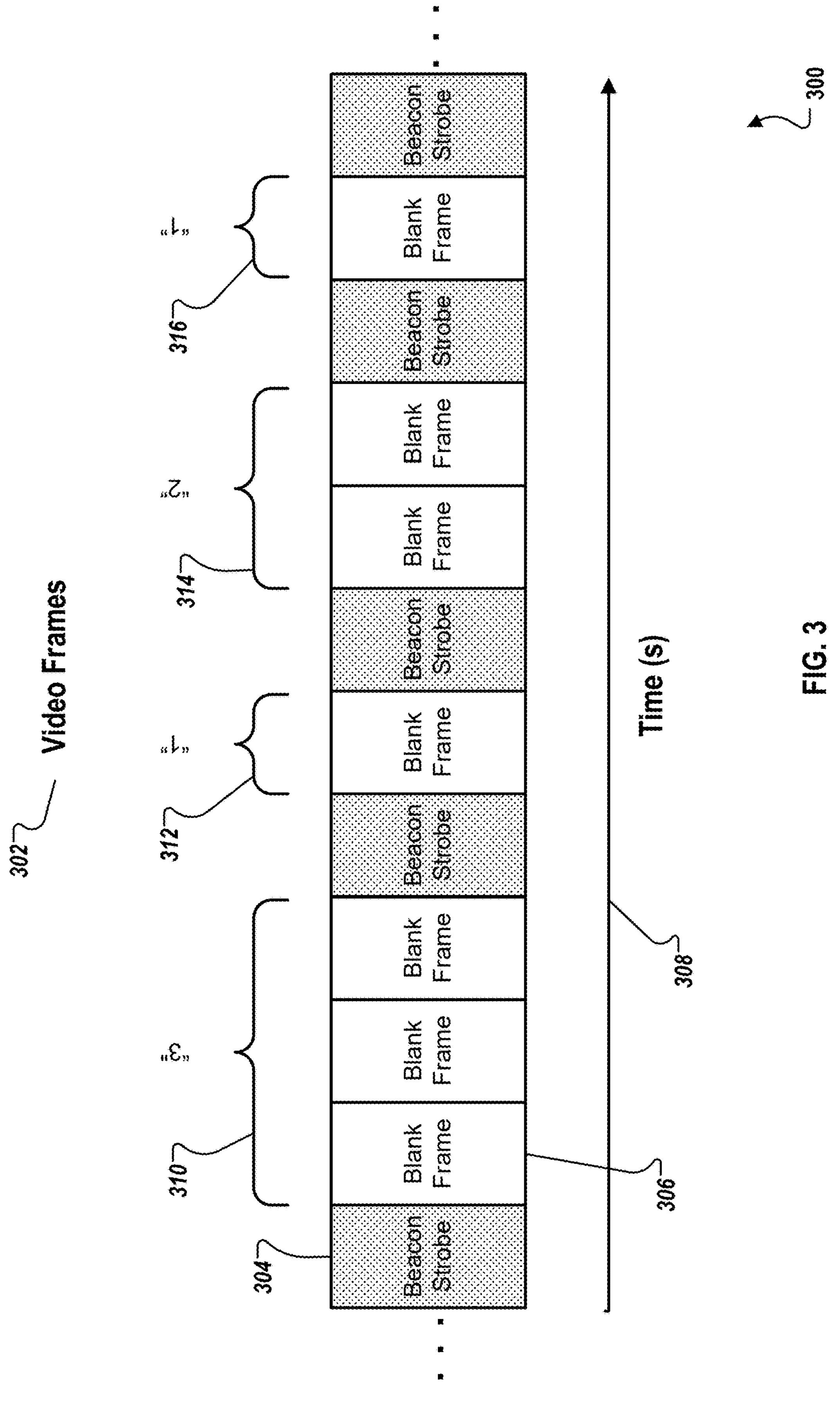
FIG. 3 is a block diagram of example video frames processed in a smart beacon video-based communication protocol, according to an implementation of the present disclosure.

FIG. 3 is a block diagram 300 of example video frames processed in a smart beacon video-based communication protocol, according to an implementation of the present disclosure.

Video frames 302 are illustrated, including both beacon strobes 304 and blank video frames 306. Time is indicated on axis 308. As previously mentioned, for the purposes of this disclosure and to aid understanding, it will be assumed that a smart beacon 110 strobe only requires one video frame in a prescribed video frame rate. In FIG. 3, twelve video frames are represented from the prescribed digital video recording frame rate (e.g., 20, 25, 30, 50, or 60 Hz). Blank video frames are shown to encode "3121" in the blank frames between strobes. In some implementations, the particular blank frame count will consistently indicate the same decoded value. For example, "3," (310) "1," (312)) "2," (314) and "1" (316) as shown in the example.

In some implementations, the code could be dynamically changing. For example, within a certain time frame, the blank frames represent a first value, outside that time frame, the same number of blank frames would represent a different second value.

Another example of coding data could include representing one or more blank video frames as entire words/symbols/phrases. For example, one blank frame could represent "building," two blank frames could represent "enter the building," and three blank frames could represent "clear the building." Any appropriate coding scheme is considered to be within the scope of this disclosure.

In some implementations, it is possible that a message could pass over threshold of one or more seconds of video frames (e.g., depending on the length of the message). As an example, if 20 bits of data is transmitted at 2 Hz modulation, it will take over 10 seconds. As previously described, the smart beacon video processor 204 of FIG. 2 can distinguish a complete or partial message and determine the complete message to relay to the client computer 206.

Uses of the described approach are numerous.

For example, in a military/law enforcement situation, the described approach can be used to permit military commander to identify multiple fixed or moving objects (e.g., buildings, vehicles, troops, or equipment) simultaneously and in real-time with IFF functionality. The functionality will help mitigate friendly fire and provide enhanced situational awareness in a combat/enforcement situation.

In another example, smart beacons 110 can be used on fixed objects to provide an identification of a known geographic location for use in location determination, such as triangulation). This could be extremely useful with respect to air navigation to mark rail ways, roads, coastal boundaries (such as coastlines and at-sea buoys), aircraft carrier decks, landing pads, runways (e.g., using ground lights), oil platforms, landmarks, etc. For example, if the global positioning system is not available or lacking necessary precision, the described approach could provide known geographic locations to allows aircraft to determine their exact position with respect to smart beacons 110. This is useful where aircraft are GPS denied (such as, in combat zones).

In some implementations, satellites instead of, or in addition to, analyzing star fields, could view and triangulate their positions using ground-based smart beacons 110. This could permit additional locational awareness and precision. From space or low-Earth orbit, satellites capable of viewing smart beacons 110 could also track/ID vehicles, trains, boats, ships, submarines (e.g., a smart beacon 110 mounted on periscope or radio mast), and aircraft.

SOS or other distress signals could be transmitted by smart beacons 110 and be visible from overhead aircraft and satellites. An example could include backpackers/hikers in the wilderness or boats at sea that could be in distress but out of range of wireless/radio communication. A smart beacon 110 could be activated and programmed to include a distress signal visible from the air or space. Once detected, identification, location, and message could be relayed to appropriate organizations/individuals.

Scientific atmospheric/climate studies could be performed using smart beacons 110. For example, floating current buoys could be released at sea and detected from air space to track movement, speed, and location. Balloons could also be equipped with smart beacons 110 to track movement, speed, and location of winds, atmospheric conditions, hurricanes, and tornados.

With respect to climate studies, a small hardened smart beacon 110 assembly with other sensors for, for example, atmospheric pressure, humidity, and temperature could be released in groups of many (for example, dumped out of the back of a truck) in the projected path of a tornado to hopefully be pulled into the tornado to permit study of updraft, speed, temperature, pressure, and humidity. The smart beacon 110 assembly could emit MWIR so it could be seen by cameras sensitive to MWIR and viewing the tornado and individual smart beacon 110 assemblies could be tracked as they move through the tornado system. Visible light emitters or radio/audio emitters could be used to locate and recover smart beacon 110 assemblies for further study.

Animals could also be tagged with smart beacons 110 to track location, migration patterns, movement, and territory. Examples could include wolves, caribou, birds, and whales.

Smart beacons 110 could also be used with respect to hunting to help identify members of a hunting party or other humans when viewed through a binocular, spotting scope, or weapons scope with built in digital video camera functionality. The smart beacons 110 could display a name and warning that the person is visible within the digital device and to exercise caution.

In some implementations, smart beacons 110 could be used with augmented reality (AR) equipment to enhance an AR experience. For example, smart beacons 110 could be placed on points of interest in positions visible by AR headsets or smart phone cameras and provide data useful in the AR headset.

Smart beacons 110 can also be used to help determination location from the ground. For example, smart beacons 110 can be placed on the tops of buildings, mountains, or towers to permit digital devices with a capability to read the smart beacon 110 to further refine its determined location for, for example, location services function(s).

Figure 4:
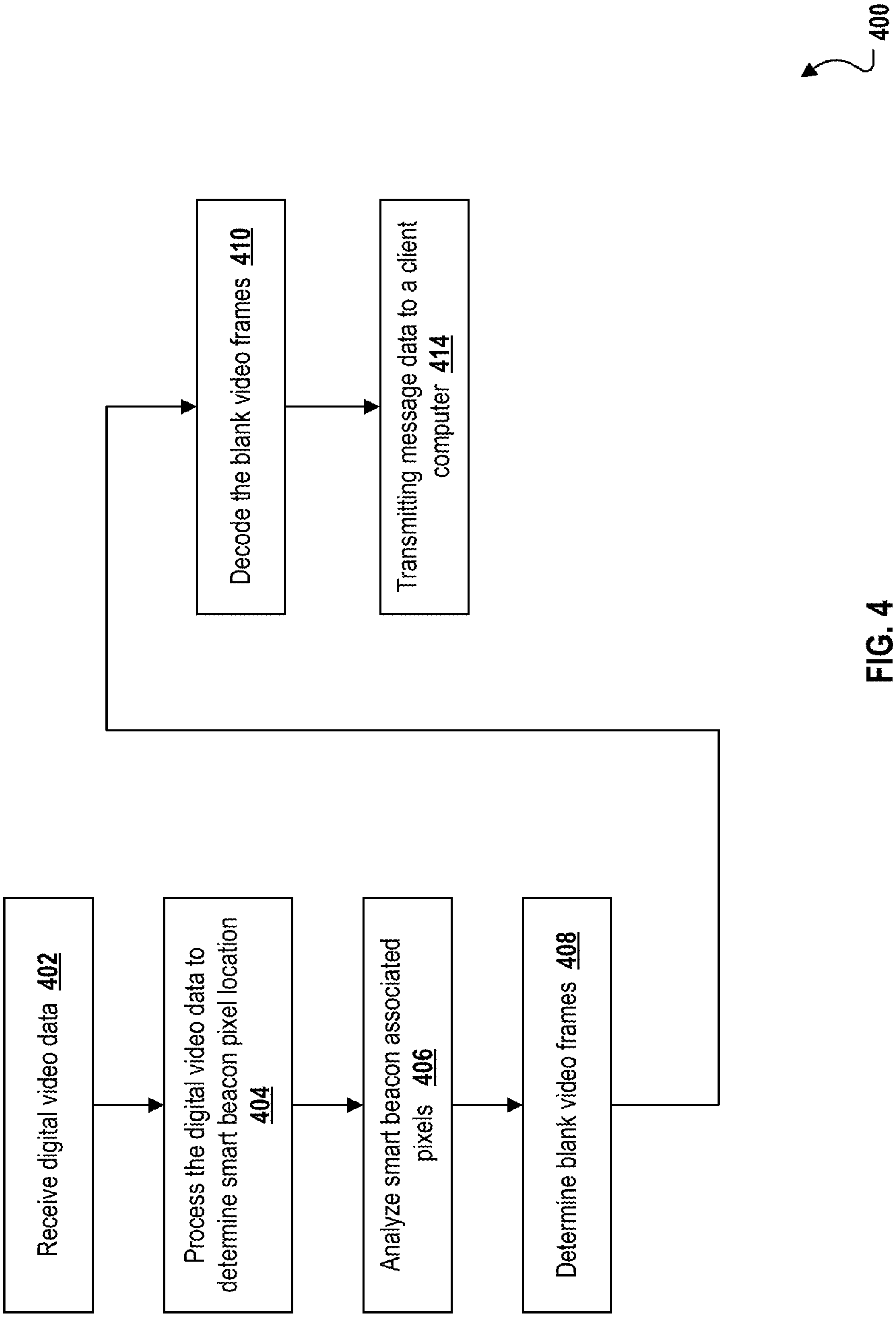
FIG. 4 is a flowchart illustrating an example of a computer-implemented method for a smart beacon video-based communication protocol, according to an implementation of the present disclosure.

FIG. 4 is a flowchart illustrating an example of a computer-implemented method 400 for providing a smart beacon video-based communication protocol, according to an implementation of the present disclosure. For clarity of presentation, the description that follows generally describes method 400 in the context of the other figures in this description. However, it will be understood that method 400 can be performed, for example, by any system, environment, software, and hardware, or a combination of systems, environments, software, and hardware, as appropriate. In some implementations, various steps of method 400 can be run in parallel, in combination, in loops, or in any order.

At 402, digital video data, including light from a smart beacon, is received by a smart beacon video processor and from a digital video camera. In some implementations, the light is mid-wave (MW) infrared (IR), broadband thermal, near-IR (NIR), short-wave IR (SWIR), or visible light spectrum. In some implementations, the digital video camera is recording the digital video data at a frame rate of 20, 25, 30, 50, or 60 Hz. From 402, method 400 proceeds to 404.

At 404, the digital video data is processed by the smart beacon video processor to determine a smart beacon pixel location. From 404, method 400 proceeds to 406.

At 406, the smart beacon pixel location is analyzed by the smart beacon video processor. From 406, method 400 proceeds to 408.

At 408, blank video frames associated with the smart beacon pixel location are determined by the smart beacon video processor as determined blank video frames. From 408, method 400 proceeds to 410.

At 410, the determined blank video frames are decoded by the smart beacon video processor as message data. In some implementations, each number of blank video frames is associated with a numerical value, symbol, word, or phrase. In some implementations, the determining and decoding is performed at least twice to ensure the message data is complete. In some implementations, the smart beacon video processor transmits the message data to a client computer. In some implementations, a halo including an identification or message associated with the smart beacon pixel location is generated. After 410, method 400 can stop.

Figure 5:
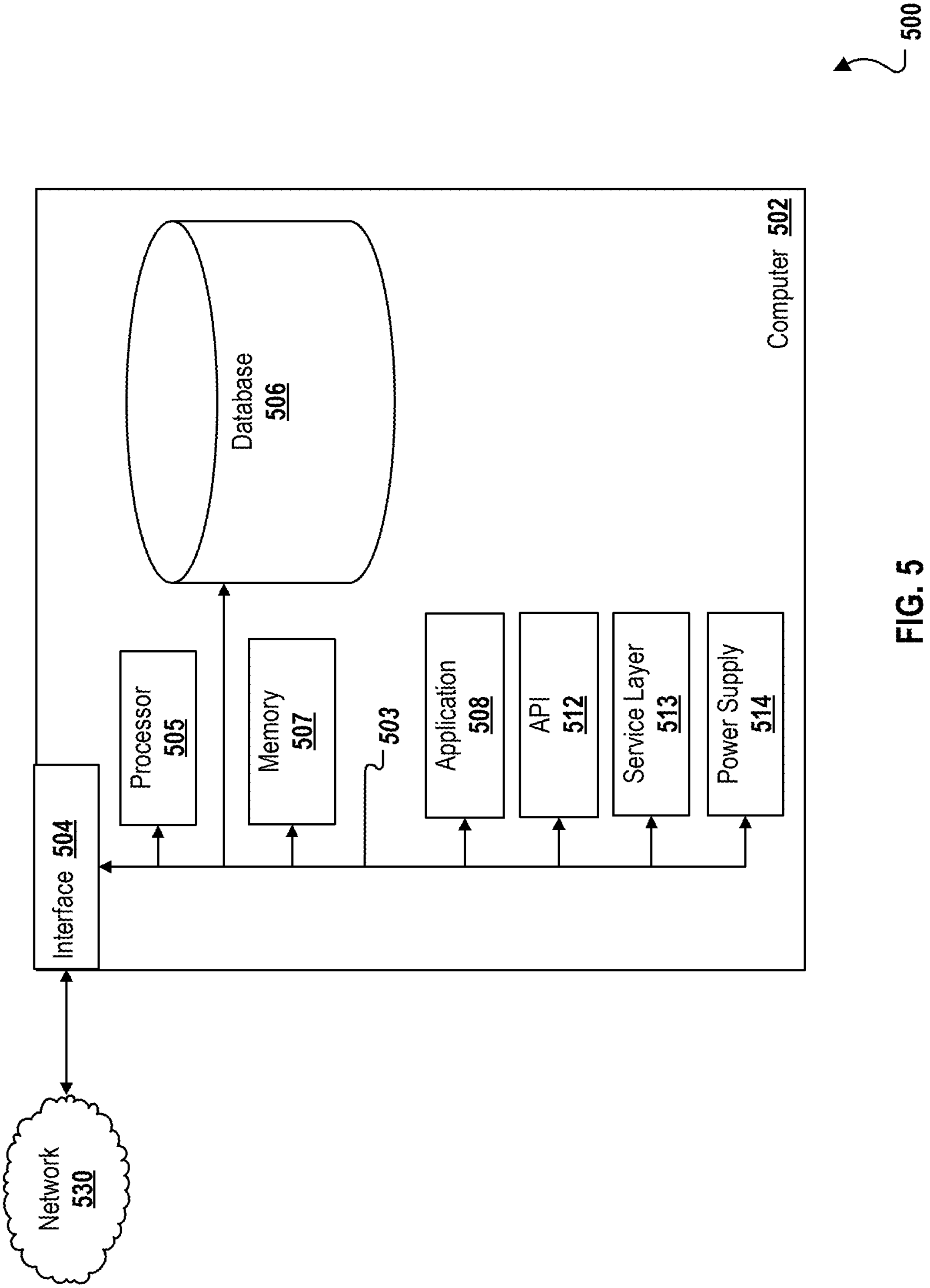
FIG. 5 is a block diagram illustrating an example of a computer-implemented system used to provide computational functionalities associated with described algorithms, methods, functions, processes, flows, and procedures, according to an implementation of the present disclosure.

FIG. 5 is a block diagram illustrating an example of a computer-implemented System 500 used to provide computational functionalities associated with described algorithms, methods, functions, processes, flows, and procedures, according to an implementation of the present disclosure. In the illustrated implementation, computer-implemented system 500 includes a Computer 502 and a Network 530.

The illustrated Computer 502 is intended to encompass any computing device, such as a server, desktop computer, laptop/notebook computer, wireless data port, smart phone, personal data assistant (PDA), tablet computer, one or more processors within these devices, or a combination of computing devices, including physical or virtual instances of the computing device, or a combination of physical or virtual instances of the computing device. Additionally, the Computer 502 can include an input device, such as a keypad, keyboard, or touch screen, or a combination of input devices that can accept user information, and an output device that conveys information associated with the operation of the Computer 502, including digital data, visual, audio, another type of information, or a combination of types of information, on a graphical-type user interface (UI) (or GUI) or other UI.

The Computer 502 can serve in a role in a distributed computing system as, for example, a client, network component, a server, or a database or another persistency, or a combination of roles for performing the subject matter described in the present disclosure. The illustrated Computer 502 is communicably coupled with a Network 530. In some implementations, one or more components of the Computer 502 can be configured to operate within an environment, or a combination of environments, including cloud-computing, local, or global.

At a high level, the Computer 502 is an electronic computing device operable to receive, transmit, process, store, or manage data and information associated with the described subject matter. According to some implementations, the Computer 502 can also include or be communicably coupled with a server, such as an application server, e-mail server, web server, caching server, or streaming data server, or a combination of servers.

The Computer 502 can receive requests over Network 530 (for example, from a client software application executing on another Computer 502) and respond to the received requests by processing the received requests using a software application or a combination of software applications. In addition, requests can also be sent to the Computer 502 from internal users (for example, from a command console or by another internal access method), external or third-parties, or other entities, individuals, systems, or computers.

Each of the components of the Computer 502 can communicate using a System Bus 503. In some implementations, any or all of the components of the Computer 502, including hardware, software, or a combination of hardware and software, can interface over the System Bus 503 using an application programming interface (API) 512, a Service Layer 513, or a combination of the API 512 and Service Layer 513. The API 512 can include specifications for routines, data structures, and object classes. The API 512 can be either computer-language independent or dependent and refer to a complete interface, a single function, or even a set of APIs. The Service Layer 513 provides software services to the Computer 502 or other components (whether illustrated or not) that are communicably coupled to the Computer 502. The functionality of the Computer 502 can be accessible for all service consumers using the Service Layer 513. Software services, such as those provided by the Service Layer 513, provide reusable, defined functionalities through a defined interface. For example, the interface can be software written in a computing language (for example JAVA or C++) or a combination of computing languages, and providing data in a particular format (for example, extensible markup language (XML)) or a combination of formats. While illustrated as an integrated component of the Computer 502, alternative implementations can illustrate the API 512 or the Service Layer 513 as stand-alone components in relation to other components of the Computer 502 or other components (whether illustrated or not) that are communicably coupled to the Computer 502. Moreover, any or all parts of the API 512 or the Service Layer 513 can be implemented as a child or a sub-module of another software module, enterprise application, or hardware module without departing from the scope of the present disclosure.

The Computer 502 includes an Interface 504. Although illustrated as a single Interface 504, two or more Interfaces 504 can be used according to particular needs, desires, or particular implementations of the Computer 502. The Interface 504 is used by the Computer 502 for communicating with another computing system (whether illustrated or not) that is communicatively linked to the Network 530 in a distributed environment. Generally, the Interface 504 is operable to communicate with the Network 530 and includes logic encoded in software, hardware, or a combination of software and hardware. More specifically, the Interface 504 can include software supporting one or more communication protocols associated with communications such that the Network 530 or hardware of Interface 504 is operable to communicate physical signals within and outside of the illustrated Computer 502.

The Computer 502 includes a Processor 505. Although illustrated as a single Processor 505, two or more Processors 505 can be used according to particular needs, desires, or particular implementations of the Computer 502. Generally, the Processor 505 executes instructions and manipulates data to perform the operations of the Computer 502 and any algorithms, methods, functions, processes, flows, and procedures as described in the present disclosure.

The Computer 502 also includes a Database 506 that can hold data for the Computer 502, another component communicatively linked to the Network 530 (whether illustrated or not), or a combination of the Computer 502 and another component. For example, Database 506 can be an in-memory or conventional database storing data consistent with the present disclosure. In some implementations, Database 506 can be a combination of two or more different database types (for example, a hybrid in-memory and conventional database) according to particular needs, desires, or particular implementations of the Computer 502 and the described functionality. Although illustrated as a single Database 506, two or more databases of similar or differing types can be used according to particular needs, desires, or particular implementations of the Computer 502 and the described functionality. While Database 506 is illustrated as an integral component of the Computer 502, in alternative implementations, Database 506 can be external to the Computer 502. The Database 506 can hold and operate on at least any data type mentioned or any data type consistent with this disclosure.

The Computer 502 also includes a Memory 507 that can hold data for the Computer 502, another component or components communicatively linked to the Network 530 (whether illustrated or not), or a combination of the Computer 502 and another component. Memory 507 can store any data consistent with the present disclosure. In some implementations, Memory 507 can be a combination of two or more different types of memory (for example, a combination of semiconductor and magnetic storage) according to particular needs, desires, or particular implementations of the Computer 502 and the described functionality. Although illustrated as a single Memory 507, two or more Memories 507 or similar or differing types can be used according to particular needs, desires, or particular implementations of the Computer 502 and the described functionality. While Memory 507 is illustrated as an integral component of the Computer 502, in alternative implementations, Memory 507 can be external to the Computer 502.

The Application 508 is an algorithmic software engine providing functionality according to particular needs, desires, or particular implementations of the Computer 502, particularly with respect to functionality described in the present disclosure. For example, Application 508 can serve as one or more components, modules, or applications. Further, although illustrated as a single Application 508, the Application 508 can be implemented as multiple Applications 508 on the Computer 502. In addition, although illustrated as integral to the Computer 502, in alternative implementations, the Application 508 can be external to the Computer 502.

The Computer 502 can also include a Power Supply 514. The Power Supply 514 can include a rechargeable or non-rechargeable battery that can be configured to be either user- or non-user-replaceable. In some implementations, the Power Supply 514 can include power-conversion or management circuits (including recharging, standby, or another power management functionality). In some implementations, the Power Supply 514 can include a power plug to allow the Computer 502 to be plugged into a wall socket or another power source to, for example, power the Computer 502 or recharge a rechargeable battery.

There can be any number of Computers 502 associated with, or external to, a computer system containing Computer 502, each Computer 502 communicating over Network 530. Further, the term "client," "user," or other appropriate terminology can be used interchangeably, as appropriate, without departing from the scope of the present disclosure. Moreover, the present disclosure contemplates that many users can use one Computer 502, or that one user can use multiple computers 502.

Described implementations of the subject matter can include one or more features, alone or in combination.

For example, in a first implementation, a computer-implemented method, comprising: receiving, by a smart beacon video processor and from a digital video camera, digital video data including light from a smart beacon; processing, by the smart beacon video processor, the digital video data to determine a smart beacon pixel location; analyzing, by the smart beacon video processor, the smart beacon pixel location; determining, by the smart beacon video processor and as determined blank video frames, blank video frames associated with the smart beacon pixel location; and decoding, by the smart beacon video processor and as message data, the determined blank video frames.

The foregoing and other described implementations can each, optionally, include one or more of the following features:

A first feature, combinable with any of the following features, wherein the light is mid-wave (MW) infrared (IR), broadband thermal, near-IR (NIR), short-wave IR (SWIR), or visible light spectrum.

A second feature, combinable with any of the previous or following features, wherein the digital video camera is recording the digital video data at a frame rate of 20, 25, 30, 50, or 60 Hz.

A third feature, combinable with any of the previous or following features, wherein each number of blank video frames is associated with a numerical value, symbol, word, or phrase.

A fourth feature, combinable with any of the previous or following features, wherein the determining and decoding is performed at least twice to ensure the message data is complete.

A fifth feature, combinable with any of the previous or following features, comprising transmitting, by the smart beacon video processor, the message data to a client computer.

A sixth feature, combinable with any of the previous or following features, comprising generating a halo including an identification or message associated with the smart beacon pixel location.

In a second implementation, a non-transitory, computer-readable medium storing one or more instructions executable by a computer system to perform one or more operations, comprising: receiving, by a smart beacon video processor and from a digital video camera, digital video data including light from a smart beacon; processing, by the smart beacon video processor, the digital video data to determine a smart beacon pixel location; analyzing, by the smart beacon video processor, the smart beacon pixel location; determining, by the smart beacon video processor and as determined blank video frames, blank video frames associated with the smart beacon pixel location; and decoding, by the smart beacon video processor and as message data, the determined blank video frames.

The foregoing and other described implementations can each, optionally, include one or more of the following features:

A first feature, combinable with any of the following features, wherein the light is mid-wave (MW) infrared (IR), broadband thermal, near-IR (NIR), short-wave IR (SWIR), or visible light spectrum.

A second feature, combinable with any of the previous or following features, wherein the digital video camera is recording the digital video data at a frame rate of 20, 25, 30, 50, or 60 Hz.

A third feature, combinable with any of the previous or following features, wherein each number of blank video frames is associated with a numerical value, symbol, word, or phrase.

A fourth feature, combinable with any of the previous or following features, wherein the determining and decoding is performed at least twice to ensure the message data is complete.

A fifth feature, combinable with any of the previous or following features, comprising transmitting, by the smart beacon video processor, the message data to a client computer.

A sixth feature, combinable with any of the previous or following features, comprising generating a halo including an identification or message associated with the smart beacon pixel location.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations, comprising: receiving, by a smart beacon video processor and from a digital video camera, digital video data including light from a smart beacon; processing, by the smart beacon video processor, the digital video data to determine a smart beacon pixel location; analyzing, by the smart beacon video processor, the smart beacon pixel location; determining, by the smart beacon video processor and as determined blank video frames, blank video frames associated with the smart beacon pixel location; and decoding, by the smart beacon video processor and as message data, the determined blank video frames.

The foregoing and other described implementations can each, optionally, include one or more of the following features:

A first feature, combinable with any of the following features, wherein the light is mid-wave (MW) infrared (IR), broadband thermal, near-IR (NIR), short-wave IR (SWIR), or visible light spectrum.

A second feature, combinable with any of the previous or following features, wherein the digital video camera is recording the digital video data at a frame rate of 20, 25, 30, 50, or 60 Hz.

A third feature, combinable with any of the previous or following features, wherein each number of blank video frames is associated with a numerical value, symbol, word, or phrase.

A fourth feature, combinable with any of the previous or following features, wherein the determining and decoding is performed at least twice to ensure the message data is complete.

A fifth feature, combinable with any of the previous or following features, comprising transmitting, by the smart beacon video processor, the message data to a client computer.

A sixth feature, combinable with any of the previous or following features, comprising generating a halo including an identification or message associated with the smart beacon pixel location.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs, that is, one or more modules of computer program instructions encoded on a tangible, non-transitory, computer-readable medium for execution by, or to control the operation of, a computer or computer-implemented system. Alternatively, or additionally, the program instructions can be encoded in/on an artificially generated propagated signal, for example, a machine-generated electrical, optical, or electromagnetic signal that is generated to encode information for transmission to a receiver apparatus for execution by a computer or computer-implemented system. The computer-storage medium can be a machine-readable storage device, a machine-readable storage substrate, a random or serial access memory device, or a combination of computer-storage mediums. Configuring one or more computers means that the one or more computers have installed hardware, firmware, or software (or combinations of hardware, firmware, and software) so that when the software is executed by the one or more computers, particular computing operations are performed. The computer storage medium is not, however, a propagated signal.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data can be less than 1 millisecond (ms), less than 1 second(s), or less than 5 s. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," "computing device," or "electronic computer device" (or an equivalent term as understood by one of ordinary skill in the art) refer to data processing hardware and encompass all kinds of apparatuses, devices, and machines for processing data, including by way of example, a programmable processor, a computer, or multiple processors or computers. The computer can also be, or further include special-purpose logic circuitry, for example, a central processing unit (CPU), a field-programmable gate array (FPGA), or an application-specific integrated circuit (ASIC). In some implementations, the computer or computer-implemented system or special-purpose logic circuitry (or a combination of the computer or computer-implemented system and special-purpose logic circuitry) can be hardware- or software-based (or a combination of both hardware- and software-based). The computer can optionally include code that creates an execution environment for computer programs, for example, code that constitutes processor firmware, a protocol stack, a database management system, an operating system, or a combination of execution environments. The present disclosure contemplates the use of a computer or computer-implemented system with an operating system, for example LINUX, UNIX, WINDOWS, MAC OS, ANDROID, or IOS, or a combination of operating systems.

A computer program, which can also be referred to or described as a program, software, a software application, a unit, a module, a software module, a script, code, or other component can be written in any form of programming language, including compiled or interpreted languages, or declarative or procedural languages, and it can be deployed in any form, including, for example, as a stand-alone program, module, component, or subroutine, for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network.

While portions of the programs illustrated in the various figures can be illustrated as individual components, such as units or modules, that implement described features and functionality using various objects, methods, or other processes, the programs can instead include a number of sub-units, sub-modules, third-party services, components, libraries, and other components, as appropriate. Conversely, the features and functionality of various components can be combined into single components, as appropriate. Thresholds used to make computational determinations can be statically, dynamically, or both statically and dynamically determined.

Described methods, processes, or logic flows represent one or more examples of functionality consistent with the present disclosure and are not intended to limit the disclosure to the described or illustrated implementations, but to be accorded the widest scope consistent with described principles and features. The described methods, processes, or logic flows can be performed by one or more programmable computers executing one or more computer programs to perform functions by operating on input data and generating output data. The methods, processes, or logic flows can also be performed by, and computers can also be implemented as, special-purpose logic circuitry, for example, a CPU, an FPGA, or an ASIC.

Computers for the execution of a computer program can be based on general or special-purpose microprocessors, both, or another type of CPU. Generally, a CPU will receive instructions and data from and write to a memory. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable memory storage device, for example, a universal serial bus (USB) flash drive, to name just a few.

Non-transitory computer-readable media for storing computer program instructions and data can include all forms of permanent/non-permanent or volatile/non-volatile memory, media and memory devices, including by way of example semiconductor memory devices, for example, random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices; magnetic devices, for example, tape, cartridges, cassettes, internal/removable disks; magneto-optical disks; and optical memory devices, for example, digital versatile/video disc (DVD), compact disc (CD)-ROM, DVD+/−R, DVD-RAM, DVD-ROM, high-definition/density (HD)-DVD, and BLU-RAY/BLU-RAY DISC (BD), and other optical memory technologies. The memory can store various objects or data, including caches, classes, frameworks, applications, modules, backup data, jobs, web pages, web page templates, data structures, database tables, repositories storing dynamic information, or other appropriate information including any parameters, variables, algorithms, instructions, rules, constraints, or references. Additionally, the memory can include other appropriate data, such as logs, policies, security or access data, or reporting files. The processor and the memory can be supplemented by, or incorporated in, special-purpose logic circuitry.

To provide for interaction with a user, implementations of the subject matter described in this specification can be implemented on a computer having a display device, for example, a cathode ray tube (CRT), liquid crystal display (LCD), light emitting diode (LED), or plasma monitor, for displaying information to the user and a keyboard and a pointing device, for example, a mouse, trackball, or trackpad by which the user can provide input to the computer. Input can also be provided to the computer using a touchscreen, such as a tablet computer surface with pressure sensitivity or a multi-touch screen using capacitive or electric sensing. Other types of devices can be used to interact with the user. For example, feedback provided to the user can be any form of sensory feedback (such as, visual, auditory, tactile, or a combination of feedback types). Input from the user can be received in any form, including acoustic, speech, or tactile input. In addition, a computer can interact with the user by sending documents to and receiving documents from a client computing device that is used by the user (for example, by sending web pages to a web browser on a user's mobile computing device in response to requests received from the web browser).

The term "graphical user interface (GUI) can be used in the singular or the plural to describe one or more graphical user interfaces and each of the displays of a particular graphical user interface. Therefore, a GUI can represent any graphical user interface, including but not limited to, a web browser, a touch screen, or a command line interface (CLI) that processes information and efficiently presents the information results to the user. In general, a GUI can include a number of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11x or other protocols, all or a portion of the Internet, another communication network (such as direct laser communication), or a combination of communication networks. The communication network can communicate with, for example, Internet Protocol (IP) packets, frame relay frames, Asynchronous Transfer Mode (ATM) cells, voice, video, data, or other information between network nodes.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventive concept or on the scope of what can be claimed, but rather as descriptions of features that can be specific to particular implementations of particular inventive concepts. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features can be described as acting in certain combinations and even initially claimed as such, one or more features from a claimed combination can, in some cases, be excised from the combination, and the claimed combination can be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations can be considered optional), to achieve desirable results. In certain circumstances, multitasking or parallel processing (or a combination of multitasking and parallel processing) can be advantageous and performed as deemed appropriate.

The separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:

receiving, by a smart beacon video processor and from a digital video camera, digital video data including light from a smart beacon;

processing, by the smart beacon video processor, the digital video data to determine a smart beacon pixel location;

analyzing, by the smart beacon video processor, the smart beacon pixel location;

determining, by the smart beacon video processor and as determined blank video frames, blank video frames associated with the smart beacon pixel location; and decoding, by the smart beacon video processor and as message data, the determined blank video frames.

2. The computer-implemented method of claim 1, wherein the light is mid-wave (MW) infrared (IR), broadband thermal, near-IR (NIR), short-wave IR (SWIR), or visible light spectrum.

3. The computer-implemented method of claim 1, wherein the digital video camera is recording the digital video data at a frame rate of 20, 25, 30, 50, or 60 Hz.

4. The computer-implemented method of claim 1, wherein each number of blank video frames is associated with a numerical value, symbol, word, or phrase.

5. The computer-implemented method of claim 1, wherein the determining and decoding is performed at least twice to ensure the message data is complete.

6. The computer-implemented method of claim 1, comprising transmitting, by the smart beacon video processor, the message data to a client computer.

7. The computer-implemented method of claim 1, comprising generating a halo including an identification or message associated with the smart beacon pixel location.

8. A non-transitory, computer-readable medium storing one or more instructions executable by a computer system to perform one or more operations, comprising:

receiving, by a smart beacon video processor and from a digital video camera, digital video data including light from a smart beacon;

processing, by the smart beacon video processor, the digital video data to determine a smart beacon pixel location;

analyzing, by the smart beacon video processor, the smart beacon pixel location;

determining, by the smart beacon video processor and as determined blank video frames, blank video frames associated with the smart beacon pixel location; and decoding, by the smart beacon video processor and as message data, the determined blank video frames.

9. The non-transitory, computer-readable medium of claim 8, wherein the light is mid-wave (MW) infrared (IR), broadband thermal, near-IR (NIR), short-wave IR (SWIR), or visible light spectrum.

10. The non-transitory, computer-readable medium of claim 8, wherein the digital video camera is recording the digital video data at a frame rate of 20, 25, 30, 50, or 60 Hz.

11. The non-transitory, computer-readable medium of claim 8, wherein each number of blank video frames is associated with a numerical value, symbol, word, or phrase.

12. The non-transitory, computer-readable medium of claim 8, wherein the determining and decoding is performed at least twice to ensure the message data is complete.

13. The non-transitory, computer-readable medium of claim 8, comprising transmitting, by the smart beacon video processor, the message data to a client computer.

14. The non-transitory, computer-readable medium of claim 8, comprising generating a halo including an identification or message associated with the smart beacon pixel location.

15. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations, comprising:

receiving, by a smart beacon video processor and from a digital video camera, digital video data including light from a smart beacon;

processing, by the smart beacon video processor, the digital video data to determine a smart beacon pixel location;

analyzing, by the smart beacon video processor, the smart beacon pixel location;

determining, by the smart beacon video processor and as determined blank video frames, blank video frames associated with the smart beacon pixel location; and decoding, by the smart beacon video processor and as message data, the determined blank video frames.

16. The computer-implemented system of claim 15, wherein the light is mid-wave (MW) infrared (IR), broadband thermal, near-IR (NIR), short-wave IR (SWIR), or visible light spectrum.

17. The computer-implemented system of claim 15, wherein the digital video camera is recording the digital video data at a frame rate of 20, 25, 30, 50, or 60 Hz.

18. The computer-implemented system of claim 15, wherein each number of blank video frames is associated with a numerical value, symbol, word, or phrase.

19. The computer-implemented system of claim 15, wherein the determining and decoding is performed at least twice to ensure the message data is complete.

20. The computer-implemented system of claim 15, comprising transmitting, by the smart beacon video processor, the message data to a client computer.

21. The computer-implemented system of claim 15, comprising generating a halo including an identification or message associated with the smart beacon pixel location.

* * * * *